No. 650,452. Patented May 29, 1900.
F. E. CASE.
SYSTEM OF TRAIN CONTROL FOR ELECTRIC MOTORS.
(Application filed Apr. 12, 1898.)
(No Model.) 2 Sheets—Sheet 1.
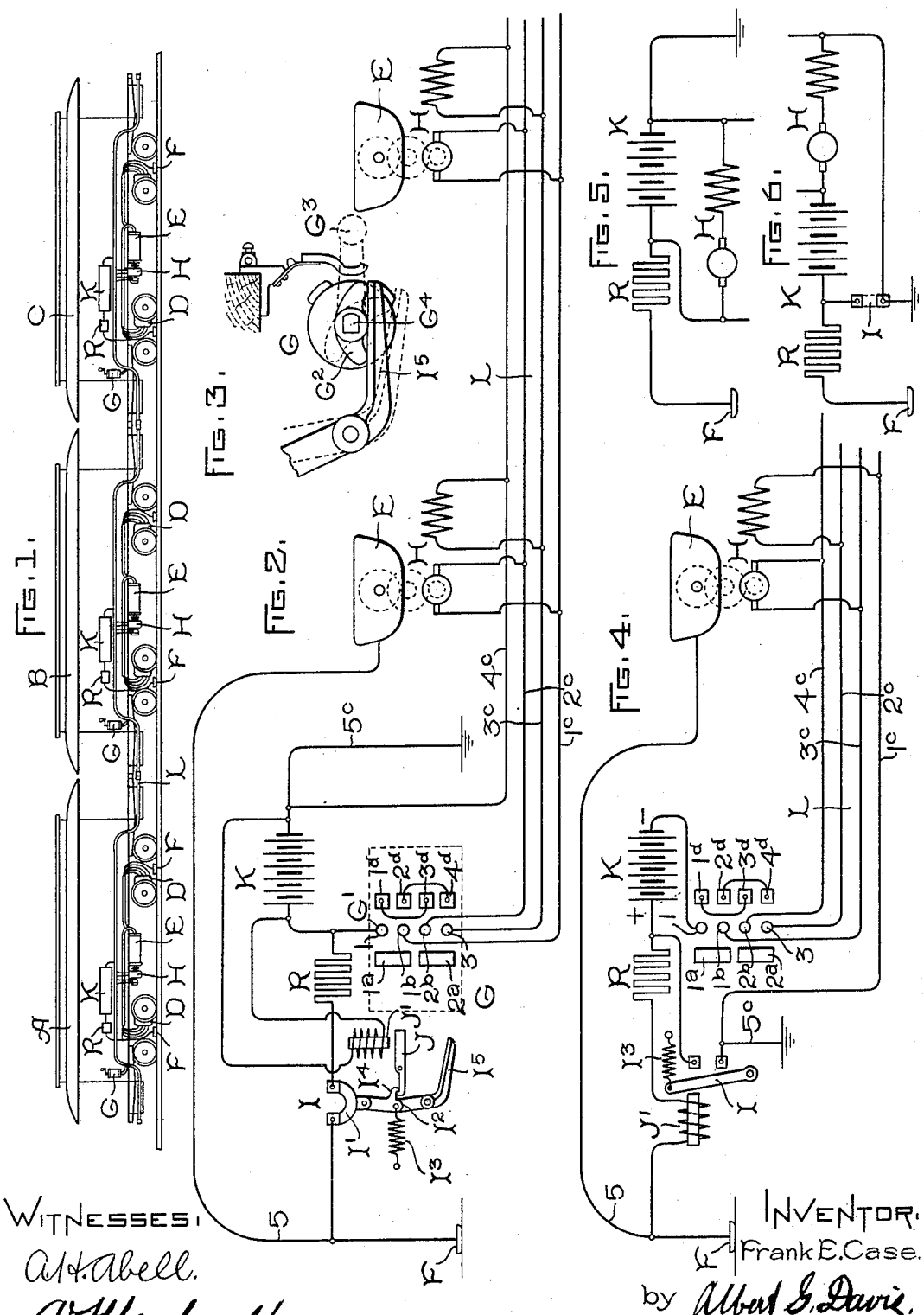
WITNESSES:
A. H. Abell.
A. H. Macdonald.
INVENTOR:
Frank E. Case.
by Albert G. Davis
Atty.

No. 650,452. Patented May 29, 1900.
F. E. CASE.
SYSTEM OF TRAIN CONTROL FOR ELECTRIC MOTORS.
(Application filed Apr. 12, 1898.)
(No Model.) 2 Sheets—Sheet 2.
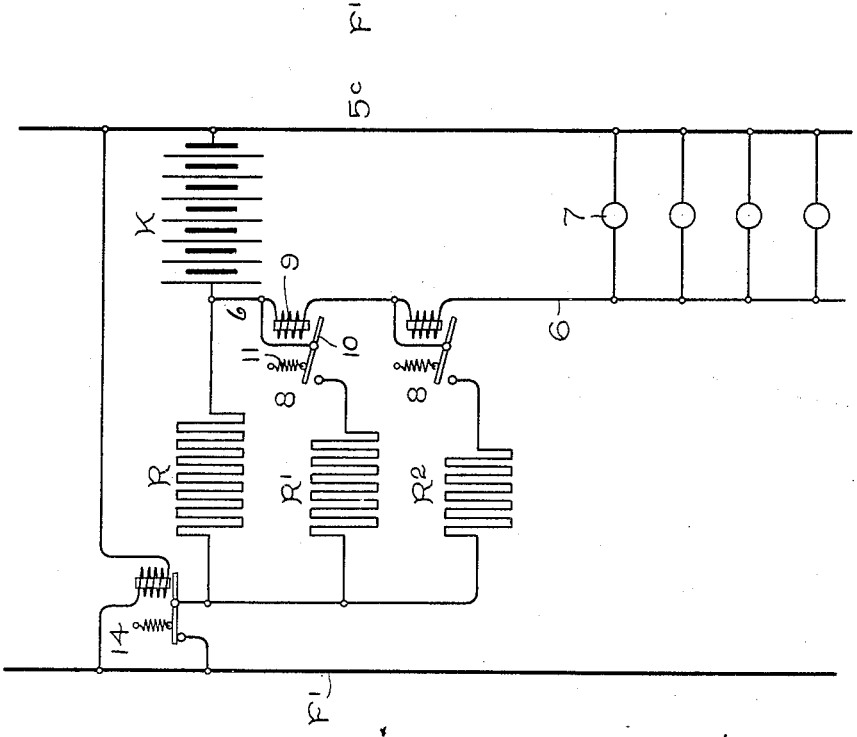
Witnesses:
A. H. Abell.
A. F. Macdonald.
Inventor:
Frank E. Case,
by Albert G. Davis
Atty.

UNITED STATES PATENT OFFICE.

FRANK E. CASE, OF SCHENECTADY, NEW YORK, ASSIGNOR TO THE GENERAL ELECTRIC COMPANY, OF NEW YORK.

SYSTEM OF TRAIN CONTROL FOR ELECTRIC MOTORS.

SPECIFICATION forming part of Letters Patent No. 650,452, dated May 29, 1900.

Application filed April 12, 1898. Serial No. 677,313. (No model.)

*To all whom it may concern:*

Be it known that I, FRANK E. CASE, a citizen of the United States, residing at Schenectady, county of Schenectady, State of New York, have invented certain new and useful Improvements in Systems of Train Control for Electric Motors, (Case No. 690,) of which the following is a specification.

My invention relates particularly to systems of train control for electric motors in which a number of motor-cars are united to form a train or a portion of a train, each motor-car being itself a complete unit—that is to say, provided with a motor or motors and a controller for regulating their operation. In systems of this kind it is preferable to control all the motors from a single point, so that changes in all the motor-circuits may be made simultaneously and correspondingly. It has been proposed to provide each controller with a small pilot-motor or other electrically-controlled device and to control the action of such device by means of a master-controller from a selected point on the train, the controlling-current being derived from the main source of supply. This arrangement is not entirely satisfactory, for if the source of supply fails for any cause the controllers are left in their last running position, and when the circuit is again established the motors, now at a standstill or running slowly, are subjected to a potential depending upon the position which the controller last occupied. This may be very injurious to the motors, as well as disagreeable to the passengers.

My invention has for one of its objects to provide in a train system of control where all the motors are controlled from a selected point a source of energy so arranged that upon any failure of the current supplied to the motors it will be operatively connected to the system in such manner that the motor-controllers may be returned to the zero position or moved to any desired position. I preferably employ a storage battery as my separate source of supply; and a further object of my invention is to provide means for regulating the charging of the storage battery.

The invention is shown and described in connection with a train system, since it has great utility in that connection; but it is also applicable for use with a great many other kinds of systems, and I aim to embrace such a use in the claims.

In the accompanying drawings, which show various embodiments of my invention, Figure 1 is a diagram of a three-car train. Fig. 2 is a diagram of the circuit connections. Fig. 3 is a detail view of the means employed to close the battery-circuit. Fig. 4 is a diagrammatic view illustrating a slight modification. Figs. 5 and 6 are diagrams of motor and battery combinations, and Figs. 7 and 8 show modifications of the battery connections.

In Fig. 1 are shown three vehicles A, B, and C, mechanically united to form a train, each vehicle being provided with motors D, a controller E, a contact device F, a master-controller G, and a storage battery K. In the particular form illustrated pilot-motors H, controlled by means of master-switches G, are mechanically connected to the controllers; but my invention is equally applicable to other master-controller systems—as, for example, to that shown in my prior application, Serial No. 671,994, filed in the Patent Office February 23, 1898. In order to simplify the arrangement of wiring and to avoid passing heavy currents through the train, the motors of each car are supplied with current by the contact device mounted on that car. Since the source of supply of an electric-railway system is liable to interruption from various causes and since it is injurious to the propelling-motors to subject them to the full or partial line potential when they are at a standstill or slowly moving, it is necessary to return the motor-controllers to their off position as soon as the source of supply fails. To accomplish this, I propose to operate the pilot-motors by means of current received from the main source of supply, together with current received from a separate source of energy, as a storage battery, for example. By this arrangement the controllers may be actuated in any desired manner, irrespective of the condition of the main source of supply.

In Fig. 2 the circuits are illustrated in detail. As this invention does not relate to the particular kind of controller employed for regulating the motors, the controller has been illustrated in a conventional manner only, as shown at E. The master-switch G is provided with a single row of brushes G', arranged to engage with the contacts situated on each side thereof. For simplicity only a single set of contacts is shown on each side of the brushes; but it is to be understood that any number of contacts, resistance or otherwise, may be employed. The support for the contacts is in dotted lines. The contacts on switch G are so arranged that when the vertical row of brushes G' rest on the contacts situated at the left current is supplied to the pilot-motors H in a manner to cause them to rotate in one direction, and when brushes G' rest on the contacts at the right in a manner to cause them to rotate in the opposite direction. The pilot-motors are shown in this case as being series wound; but any other kind of winding may be employed if desired.

In circuit between the source of supply and the storage battery K is an automatic circuit-breaker I, comprising fixed and moving contacts, the moving contact I' being secured to the upper end of a toggle $I^2$. A spring $I^3$ is employed to open the circuit as soon as the locking-detent $I^4$ is released by the armature J. The armature J is controlled by a magnet J', which is connected in shunt around the storage battery K. As long as the charge in the battery is below normal the magnet J will not affect the armature; but as soon as the charge in the battery becomes such as to cause the voltage to rise to a predetermined amount the armature will be attracted and unlock the circuit-breaker, which will be opened by the spring $I^3$.

One terminal of the battery is connected to the source of supply through a resistance R, which is employed to reduce the potential of the charging-circuit, and the other terminal is grounded by wire $5^c$. All the pilot-motors and master-switches on the train are connected to cable L and are in multiple with each other, so that when the circuits of one motor are completed in a particular manner the circuits of the other motors are correspondingly affected. This controlling may be accomplished by any one of the master-switches. All of the master-switches are shown as being mounted on motor-cars, but if the train is made up of motor and trail cars, which are arranged in any desired relation, the trail-cars may be provided with master-switches, and the controlling accomplished from any one of these switches.

Assuming that it is desired to drive the pilot-motors in a forward direction, the contacts on the left of the master-switch are moved into engagement with the stationary row of brushes G' and the circuit is as follows: From contact F through the circuit-breaker I, resistance R to brush 1, to contact $1^a$, to wire $1^c$, through the armatures of the pilot-motors on the train in multiple to wire $2^c$, to brush $2^b$, to contact $2^a$, to brush 3, to wire $3^c$, through the field-magnet coils of the pilot-motors to wire $4^c$, and to ground by wire $5^c$. If the potential of the supply-circuit is normal, a certain amount of current will pass from contact-shoe F through circuit-breaker I, resistance R, storage battery K, wire $5^c$ to ground and charge the battery. If the number of pilot-motors or other electrically-actuated devices on the train is sufficient to cause a drop in the line potential the battery K will assist the line-current to operate them. The circuits are arranged as shown in Fig. 5.

The pilot-motors being mechanically connected to the motor-controllers, the latter will change the circuit of the motors in any desired manner. To stop the pilot-motors, the contacts are returned to the position shown, and to reverse the motors in order to return the controllers E to their off position the contacts on the right are brought into engagement with the brushes. If for any reason the supply of current from contact F fails, the battery K will be in operative connection with the circuit, and by moving the master-switch G the action of the pilot-motors may be controlled in the manner above described. It will be seen that the pilot-motors are controlled by switch G whether the current is supplied by contact F or battery K.

In order to maintain the storage battery charged to a predetermined degree and this without requiring attention on the part of the motorman, the circuit-breaker I is so arranged with respect to the master-switch that each time the latter is closed the battery-charging circuit is also closed. Mounted on shaft $G^4$ of the switch G is a cam $G^2$, so arranged that when switch-handle $G^3$ is moved to either side of a central position it will move lever $I^5$ and close the circuit between the main source of supply and the battery K. If when this action takes place the battery is not charged to its normal capacity, the armature J will be in a position to engage the latch $I^4$ and hold the circuit-breaker closed; but if the battery is charged to its normal degree the coil J' will attract the armature and prevent it from locking the circuit-breaker in place when the switch-handle $G^3$ is returned to the off position. This arrangement is particularly desirable where the strength of the storage battery has been somewhat decreased by use and the car upon which it is located is returned to the car-barn. With the arrangement shown, if the charge in the battery is below normal, the circuit will remain closed until the battery has been charged to its proper degree, after which the circuit will be automatically interrupted. This arrangement largely decreases the amount of care necessary, for the charging of the batteries is automatically accomplished.

In Fig. 4 I have shown a slight modification of my invention, in which the current for driving the pilot-motors is normally obtained entirely from the main source of supply. A battery K is provided, which is connected in series with the main circuit through the pilot-motors, and in this capacity acts as an additional resistance to the passage of current. In series with the lead from the contact-shoe F is a magnet J', which under normal conditions attracts the switch-arm of circuit-breaker I and keeps open the circuit between battery K and the ground-wire $5^c$. A spring $I^3$ is provided for closing the circuit-breaker when for any reason the current from the main source of supply fails. A resistance R is employed to cut down the current which passes through the pilot-motors. For convenience of illustration I have only shown one pilot-motor, which is geared to a motor-controller E in any desired manner; but it is to be understood that there are or may be a number of these motor-controllers, each provided with a pilot-motor. In the normal operation of the system current enters from contact F. The main current passes to the motor-controller E and the propelling-motors by wire 5; but a portion flows to the pilot-motors by the following path: through magnet-coil J', resistance R, storage battery K to brush 1, and if the brushes be in engagement with the contacts now situated on the right to contact $1^d$, by cross connection to contact $3^d$, brush $2^b$, wire $4^c$, through the armatures of all the pilot-motors in multiple, wire $3^c$ to brush $1^b$, to contact $2^d$, by cross connection to contact $4^d$, to brush 3, wire $2^c$, and through the fields of the pilot-motors to wire $1^c$ and wire $5^c$ to ground. The arrangement of circuits just described is the same as that shown in Fig. 6. For convenience only one motor is shown; but it is to be understood that the other motors may be connected in multiple therewith.

Assuming that for any reason the source of supply from the contact F fails, coil J' will be deënergized and the circuit-breaker I closed by means of spring $I^3$, and the circuit will be from the positive side of the battery to circuit-breaker I, wire $1^c$, through the fields of the pilot-motors in multiple to wire $2^c$ to brush 3, and if it is desired to reverse the direction of the motors from that previously described to contact $2^a$, to brush $2^b$, thence through the armatures of the pilot-motors in multiple to wire $3^c$, to brush $1^b$, to contact $1^a$, to brush 1, to the negative side of the battery. It will be seen that the current passes through the field and armatures of the pilot-motors in an opposite direction to that previously described; but as the direction of current through both field and armatures is reversed it does not affect the direction of rotation, that being governed entirely by the contacts on the master-switch G.

In Fig. 6 is shown a diagram of the battery and motor circuits, and I have indicated in dotted lines the circuit-breaker I in the position which it occupies when the battery K is employed for driving the pilot-motors.

The invention has been shown and described in connection with pilot-motors which are arranged to operate the controllers for the propelling-motors; but it is evident that other forms of electrical devices may be employed to actuate the controllers, and I aim to embrace such an arrangement in the claims.

In Figs. 7 and 8 I have shown improved arrangements for charging and connecting the storage batteries K. Referring more particularly to Fig. 7, the battery K is connected across the circuit from the supply-conductor F' to the return-wire $5^c$, and in series with the battery is a resistance R, which regulates the current flowing therein. This resistance also acts under normal conditions to cut down the voltage of the current supplied to the storage battery. For example, with a five-hundred-volt circuit I may use a storage battery K of one hundred and twenty-five volts. At a point between the battery and resistance is connected a wire 6, which supplies current to one or more translating devices 7 in multiple with the storage battery K. These translating devices may be of any desired character, but may, if desired, comprise two pilot-motors or other controller-actuating means, whatever they may be. When only a small current is being taken by the translating devices 7, current will flow through the resistance R from the wire F' and will charge battery K. Whatever current may be needed by the translating devices will be supplied in multiple with the battery. If now the translating devices 7 begin to take a large amount of current, it is obvious that the storage battery will begin to discharge and will thus take its share of the load. At the same time a considerable amount of current will flow through the resistance R to these translating devices. It will be obvious that when a large current flows through the resistance R to the translating devices 7 the drop in the resistance will become excessive, so that in practice all, or nearly all, of the current supplied will be supplied from the storage battery K. In order to avoid this, I arrange other resistances R' $R^2$, so that when the translating devices 7 begin to take any considerable load these resistances are cut in in multiple with the resistance R. I accomplish this result by placing a solenoid 9 in series with the wire 6 and causing this solenoid to attract the armature 10 of the switch 8 against the action of the spring 11. With this arrangement when the current in the wire 6 rises to a certain predetermined amount resistance R' will be cut in in multiple with resistance R, so that energy can be supplied to the translating device with considerable economy. One or more additional resistances, as $R^2$, may also be provided, with switches so proportioned and adjusted that the more current is taken on the wire 6 the greater will be the number of resistances cut in in multiple with the resistance R, or, in other words, the greater will be the conductivity of the circuit from the supply-wire F' to the wire 6. For the sake of simplicity only three sections of resistance have been shown; but it is obvious that any number of sections may be employed, each with an automatic switch for cutting them into and out of circuit, and that the springs for the switches may have the same or different adjustments.

In order to protect the battery against accidental discharge through the propelling-motors, &c., in case the main-line current is interrupted for any reason, a circuit-breaker 14 is provided for controlling the circuit through the resistance and battery. The circuit-breaker is provided with a shunt-coil, which is connected across the mains, and will when the main-line voltage is above a certain point hold the switch closed; but as soon as the voltage decreases the spring opens the switch and interrupts the circuit at this point. By this arrangement it will be seen that the battery K, on account of its only being called upon to perform a limited amount of work, may be of small capacity; but at the same time, in the event of the trolley-circuit being interrupted, a supply of energy is always at hand and in operative condition to perform any useful work—as, for example, for actuating the motor controller or controllers.

In Fig. 8 is shown a slight modification of the arrangement shown in Fig. 7, the essential difference being that two separate circuits 12 and 13 are provided, each having an electromagnetic switch 8 for cutting it into and out of circuit. A single circuit-breaker 14, controlled by the coil in shunt to the line, serves for both of these circuits. This circuit-breaker is similar to the circuit-breaker 14 of Fig. 7. In multiple with the battery K is a set of translating devices 12, supplied from the wire 6. In series with this wire 6 is a solenoid 9, acting on a switch 8, which switch controls the resistance R', as in the form hereinbefore described; but in addition to the wire 6 there is a second wire 6', in series with which is placed a solenoid 9' of a second switch 8', controlling the resistance R³. This wire 6' supplies a number of translating devices 13 in the same manner that the wire 6 supplies the translating devices 12. The arrangement is obviously such that if any one of the sets of translating devices begins to take a considerable current the resistance corresponding to that particular set of translating devices is cut in in multiple with the resistance R. Circuit 13 is represented as working under full load conditions, the switch 8 is closed, and the sections of resistance R and R³ are connected in parallel relation. Circuit 12 is only partially loaded, the black circles indicating that certain of the translating devices 7 are cut out of circuit.

What I claim as new, and desire to secure by Letters Patent of the United States, is—

1. In a system of control for an electric motor or motors, the combination of main and separate sources of current-supply, a controller or controllers for the motor or motors, means electrically controlled for actuating the controller or controllers, and a switch for operatively connecting the separate source of supply with the said means, upon the partial or total failure of the main current source.

2. In a system of control for electric motors, the combination of a switch or switches for changing the circuit connections of the motors, electric means for actuating the switch or switches, a source of supply for the motors and for said means, and a separate source of supply for actuating said means upon the failure of the main source of supply.

3. In a system of control for electric motors mounted on separate vehicles, the combination of a plurality of electrically-actuated devices mounted on each vehicle, a source of current-supply, a switch for controlling said devices located at a selected point, and a separate source of supply connected in circuit with the main source of supply and the electrically-actuated devices in such manner that upon the partial or total failure of the main current source, it will supply current to the electrical devices.

4. In a system of control for a plurality of separate, electrically-actuated devices, the combination of a main source of supply, a switch for regulating the action of said devices, a storage battery connected to the circuit in such manner that it is being charged from the main source during the normal operation of the devices, but as soon as the source of supply wholly or partially fails, will supply current for operating the said devices, and means actuated by the switch for regulating the charging of the battery.

5. In a train system having a number of motor-cars, the combination of a plurality of pilot-motors mounted on separate cars and mechanically coupled to controllers for the motors, a main source of supply, and storage batteries mounted on separate cars so connected in circuit that they are normally being charged by the main source of supply, but upon the partial or total failure of the main source of supply, are operatively connected in circuit in a manner to drive the pilot-motors.

6. In a system of control for an electric motor, the combination of a propelling-motor, a controller for regulating the propelling-motor, a pilot-motor mechanically connected to the controller, a main source of supply for the pilot and propelling motors, a storage battery, and a master-switch for regulating the current from the main source of supply and the battery when they are supplying current to the pilot-motors.

7. In an electric railway, the combination of a motor-controller, a storage battery which receives its charging-current from the line, and means actuated by the controller when it is moved to a certain position, for closing the charging-circuit of the battery.

8. In an electric railway, the combination of a motor-controller, a storage battery which receives its charging-current from the line, means actuated by the controller, when it is moved to a certain position, for closing the charging-circuit of the battery, and means for maintaining the charging-circuit closed until the battery has been charged to a predetermined amount.

9. In an electric railway, the combination of a motor-controller, a storage battery which receives its charging-current from the line, means actuated by the controller when it is moved from the off position, for closing the charging-circuit of the battery, and means controlled by the battery for interrupting the charging-circuit when it has been charged to its normal degree.

10. In an electric railway, the combination of a motor-controller, a storage battery which receives its charging-current from the line, a circuit-breaker actuated by the controller, for closing the charging-circuit of the battery, a lock for holding the circuit-breaker closed when the charge on the battery is below normal, and a magnet connected to the battery in such manner that when the charge on the battery reaches a certain amount, it will release the lock.

11. In a system of train control, the combination of a plurality of pilot-motors, each motor being located on a separate vehicle, a main and separate source of supply on each vehicle uniting to furnish current to drive the motors on that vehicle and also to other vehicles of the train, and a switch for regulating the operation of the motors.

12. In a system of distribution, the combination of a main and a secondary source of current-supply, translating devices arranged to receive energy from one or both of the sources of supply, and means for decreasing the resistance in circuit with one of the sources of supply, without affecting that in circuit with the other.

13. In a system of distribution, the combination of a main source of current-supply, a storage battery, translating devices arranged to receive energy from one or both of the sources of supply, and an automatic switch for decreasing the resistance in circuit with the main source of supply, without affecting the resistance of the circuit supplied by the battery.

14. In a system of distribution, the combination of a main source of current-supply, a storage battery arranged to be charged from said source, translating devices connected to the battery and the main source of supply, resistances arranged in sections and connected in series between the source of supply and the battery, and contacts for cutting the sections into and out of circuit.

15. In a system of distribution, the combination of a main source of current-supply, a storage battery arranged to be charged from said source, a circuit-main which is connected to the circuit at a point between the battery and the main source of supply, translating devices connected between the circuit-main and the negative side of the battery, and automatic means for increasing the current which is supplied to the circuit-main from the main source of supply at the time the load on the circuit increases.

16. In a system of distribution, the combination of a main and a separate source of energy, translating devices supplied with current from one or both of said sources, and a plurality of automatic switches for successively decreasing and increasing the resistance in circuit between the main source of energy and the translating devices, independent of the resistance between the separate source and the translating devices.

17. In a system of distribution, the combination of a main and a separate source of energy, a plurality of separate circuits, each supplied from one or both of said sources, and automatic means for varying the resistance in each of the separate circuits.

18. In a system of distribution, the combination of a storage battery, a main source of supply arranged to charge the battery, a resistance in series with the battery, translating devices receiving current from the battery or main source of supply or both, a circuit-breaker for controlling the charging-circuit, and a shunt-coil for normally holding the breaker closed.

19. In a system of motor control, the combination of a master-controller, a motor-controller regulated by the master-controller for regulating the motors, a source of supply for the motors, an additional source of supply for supplying current for controlling the motor-controller, and means for supplying the master-controller with current at a lower voltage than that supplied to the motors.

20. In an electrically-propelled vehicle, a storage battery connected across the mains, in series with a resistance, with auxiliary translating devices in multiple with the battery, and automatic switches for cutting resistance into circuit with the devices in multiple relation.

21. In a system of motor control, the combination of a propelling-motor, a controlling device for regulating the admission of current to the motor, and a main and an auxiliary source of current-supply, for actuating the controlling device.

22. In a system of motor control, the combination of a propelling-motor, a controller for regulating the admission of current to the motor, a main source of current-supply, and a storage battery which is charged from the main source of supply for actuating the controlling device.

23. In a system of train control, the combination of a plurality of electric motors, a plurality of controlling devices therefor, a main and a separate source of supply uniting to furnish current for actuating the controlling devices, and a switch for regulating the operation of the controlling devices.

24. In a system of motor control, the combination of a propelling-motor, a regulator for the motor, electrical means for actuating the regulator, a storage battery, charging-mains therefor receiving their energy from any suitable source, and circuits connected to the said electrical means and the storage battery in such manner that both sources of current unite to supply energy for actuating the regulator.

25. In a system of motor control, the combination of a propelling-motor, a source of supply therefor, a storage battery which is arranged to receive its charge from the source of supply, a resistance for regulating the current supplied to the storage battery, a controlling device for the propelling-motor, and electrical means for actuating the controller, the said means being connected between the resistance and storage battery and the return-circuit, so that the main source of supply and the storage battery will unite in supplying current to the controller-actuating means.

26. In a system of motor control, the combination of a source of supply, a storage battery, a resistance in series with the storage battery for regulating the admission of current thereto, a propelling-motor, a controller therefor, and a pilot-motor for driving the motor-controller, which pilot-motor is connected to the circuit at a point between the resistance and the storage battery.

27. In a system of distribution, the combination of supply-mains, a storage battery receiving energy therefrom, a resistance for regulating the admission of current to the battery, a circuit connected in multiple with the storage battery, a second resistance arranged to be connected in parallel with the first for increasing the amount of current delivered by the main source of supply, and contacts for opening and closing the circuit of the second resistance.

28. In a system of distribution, the combination of a main source of supply, a storage battery which is charged therefrom and is normally in circuit therewith, a resistance in series between the source of supply and the battery, translating devices in circuit with the battery, and means so arranged that as the load on the battery is increased, the resistance in series with the battery is decreased.

In witness whereof I have hereunto set my hand this 8th day of April, 1898.

FRANK E. CASE.

Witnesses:
   B. B. HULL,
   A. H. ABELL.